(12) United States Patent
Rigollet et al.

(10) Patent No.: US 7,399,005 B2
(45) Date of Patent: Jul. 15, 2008

(54) CLAMPING SYSTEM FOR THE SEALED CONNECTION OF TWO TUBES HAVING SUPPORT SURFACES

(75) Inventors: Nicolas Rigollet, Romorantin (FR); Fabrice Prevot, Selles sur Cher (FR); Tony Rointru, Marcilly en Vault (FR)

(73) Assignee: Etablissments Caillau, Issy-Les-Moulineaux (FR)

( * ) Notice: Subject to any disclaimer, the term of this patent is extended or adjusted under 35 U.S.C. 154(b) by 249 days.

(21) Appl. No.: 10/497,718

(22) PCT Filed: Dec. 4, 2002

(86) PCT No.: PCT/FR02/04180

§ 371 (c)(1), (2), (4) Date: Jun. 4, 2004

(87) PCT Pub. No.: WO03/048624

PCT Pub. Date: Jun. 12, 2003

(65) Prior Publication Data

US 2005/0017510 A1   Jan. 27, 2005

(30) Foreign Application Priority Data

Dec. 5, 2001   (FR) .................................. 01 15737

(51) Int. Cl.
*F16L 23/12*   (2006.01)

(52) U.S. Cl. ...................... 285/407; 285/406; 285/410; 285/420; 24/279

(58) Field of Classification Search ......... 285/364–368, 285/406–415, 420; 24/279
See application file for complete search history.

(56) References Cited

U.S. PATENT DOCUMENTS

| | | | | |
|---|---|---|---|---|
| 2,424,436 A * | 7/1947 | Crater | ......................... | 285/408 |
| 2,486,565 A * | 11/1949 | Kojan et al. | .................. | 292/256 |
| 2,663,582 A | 12/1953 | Sebok | | |
| 2,675,253 A * | 4/1954 | Stade | ......................... | 285/408 |
| 2,697,570 A * | 12/1954 | Snyder | ....................... | 248/637 |
| 2,761,707 A | 9/1956 | Herman | | |
| 2,842,383 A * | 7/1958 | Merrill | ....................... | 285/413 |
| 2,851,758 A * | 9/1958 | Troeger et al. | ................ | 24/279 |
| RE24,589 E * | 1/1959 | Smith | ......................... | 285/187 |
| 2,941,823 A * | 6/1960 | Good | ......................... | 285/408 |
| 3,059,947 A * | 10/1962 | Felburg et al. | ............. | 285/410 |
| 3,499,667 A * | 3/1970 | Pfeuffer | ....................... | 285/93 |
| 3,669,474 A * | 6/1972 | Bode | ......................... | 285/336 |

(Continued)

FOREIGN PATENT DOCUMENTS

EP   0 849 518 A1   6/1998

(Continued)

*Primary Examiner*—James M Hewitt
(74) *Attorney, Agent, or Firm*—James Ray & Assoc.

(57) ABSTRACT

A clamping system for connecting two tubes (20, 22) together in leaktight manner, the facing ends of the tubes having bearing surfaces (16, 18) that project relative to the cylindrical outside surfaces of said tubes. The system comprises a collar (10) and a washer (28). The collar has a band (12) suitable for co-operating with bearing surfaces via its inside periphery defining a setback, and a bolt (24) and a nut (26) arrangement for tightening the band (12). The washer is secured to the collar (10) by fixing tabs (32, 34, 36).

18 Claims, 3 Drawing Sheets

U.S. PATENT DOCUMENTS

| | | |
|---|---|---|
| 3,822,075 A | 7/1974 | Duncan |
| 3,964,773 A * | 6/1976 | Stade et al. ............... 285/367 |
| 4,705,305 A * | 11/1987 | Ghaly ...................... 285/311 |
| 4,832,380 A * | 5/1989 | Oetiker ..................... 285/328 |
| 5,120,086 A * | 6/1992 | Nock ........................ 285/334.2 |
| 5,454,604 A * | 10/1995 | Yahagi et al. .............. 285/49 |
| 5,755,466 A * | 5/1998 | Harth ....................... 285/412 |
| 5,842,725 A * | 12/1998 | Allert ....................... 285/114 |
| 6,726,254 B2 * | 4/2004 | Feichtinger ............... 285/365 |
| 6,773,037 B2 * | 8/2004 | Spurgat ..................... 285/23 |
| 2002/0074802 A1 * | 6/2002 | Feichtinger ............... 285/415 |
| 2004/0075276 A1 * | 4/2004 | Lemke et al. ............. 285/367 |
| 2004/0262922 A1 * | 12/2004 | Andersson ................ 285/365 |
| 2006/0082154 A1 * | 4/2006 | Hartig et al. .............. 285/408 |
| 2006/0202480 A1 * | 9/2006 | Cassel et al. .............. 285/408 |

FOREIGN PATENT DOCUMENTS

FR          2 588 357          4/1987

* cited by examiner

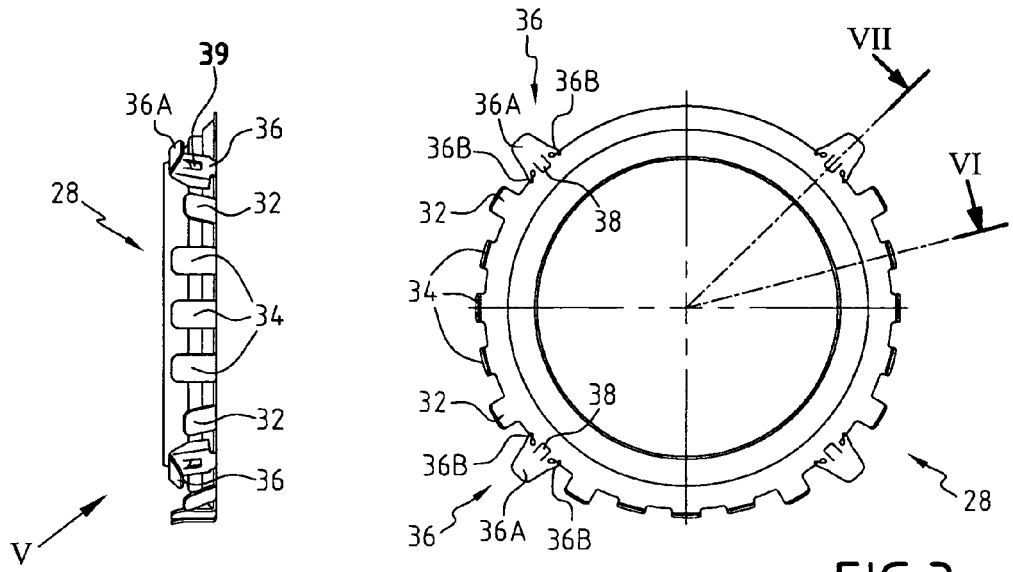
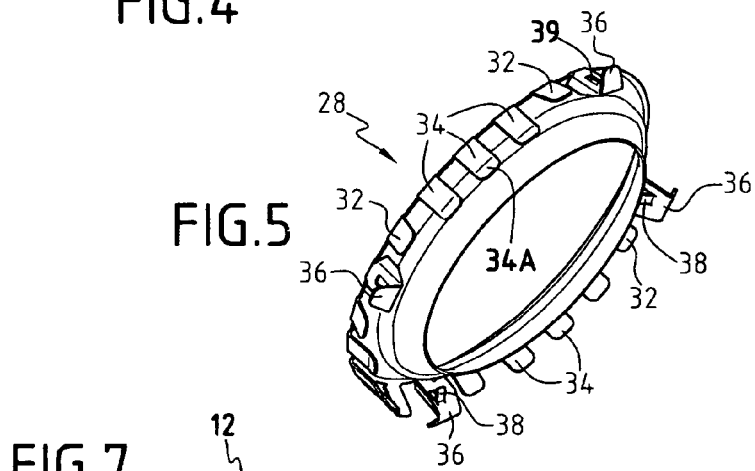
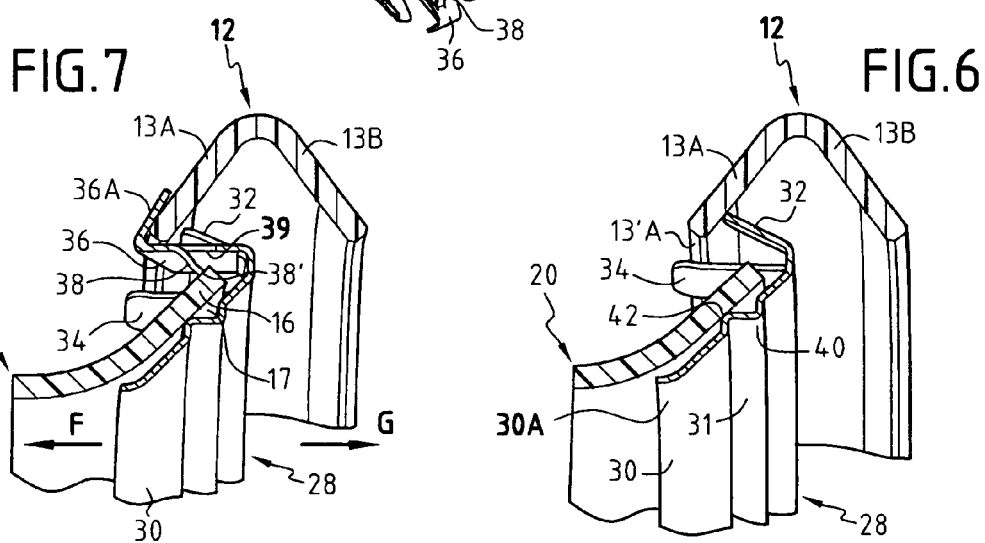

CLAMPING SYSTEM FOR THE SEALED CONNECTION OF TWO TUBES HAVING SUPPORT SURFACES

FIELD OF THE INVENTION

The present invention relates to a clamping system for connecting two tubes together in leaktight manner, the facing ends of the tubes having bearing surfaces that project relative to the cylindrical outside surfaces of said tubes, the system comprising a collar and a washer suitable for co-operating with at least one of the tubes, the collar having a band suitable for co-operating with said bearing surfaces via its inside periphery defining a setback, and means for tightening said band.

BACKGROUND OF THE INVENTION

A clamping system of this type is known from U.S. Pat. No. 3,964,773. The cross-section of the band of the collar is, for example, substantially V-shaped or U-shaped, so that each of the flanges formed by the cross-sectional shape bears against the bearing surface of the end of a respective one of the tubes. Thus, tightening the collar tends to hold the tubes one against the other. A V-shaped cross-section is advantageous insofar as, when the collar is tightened, it urges the tubes together.

For example, the means for tightening the band comprise a nut-and-bolt system. Thus, the ends of the band can be turned out so as to form bearing tabs provided with holes through which a bolt can be inserted. A nut is disposed behind one of the tabs so that turning the screw causes the collar to be tightened.

U.S. Pat. No. 3,964,773 recommends using a sealing washer between the ends of the two tubes. The washer is a conical washer which is engaged in the flared end of one of the tubes and against which the end of the other tube bears, said end of the other tube having a shape substantially complementary to the shape of said flared end.

The washer of the clamping system of U.S. Pat. No. 3,964,773 which, in the example presented by that document, serves to provide sealing, constitutes a part that is entirely distinct from the clamping collar, which must be handled separately therefrom. As a result, the entire clamping system is relatively complicated to fit, since the operator has to handle a plurality of parts and has to position each one of them correctly relative to the tubes.

Thus, in U.S. Pat. No. 3,964,733, firstly the washer must be disposed correctly relative to the end of the first tube, the end of the second tube must be disposed correctly relative to the washer, and the assembly made up of the two tubes and of the washer must be held together, and then the collar must be put in place on the assembly and must be tightened.

SUMMARY OF THE INVENTION

An object of the invention is to improve that state of the art by proposing a clamping system comprising a collar and a washer and that is simple to handle and to put in place on the tubes.

This object is achieved by the fact that said washer is secured to the collar by fixing means.

The clamping system comprising the clamping collar and the washer is made much easier to handle and to put in place on the tubes. This simplifies the work of the operator who is to clamp the two tubes together by means of the clamping system, and makes it possible to avoid, or at least to limit, the risks of fitting error.

Advantageously, the fixing means comprise fixing members suitable for being deformed when the band is tightened.

Such fixing means make it possible to secure the washer to the collar without impeding tightening of the collar.

In an advantageous configuration, the fixing means comprise tabs secured to or integral with the washer and having free ends suitable for co-operating with the band of the collar.

Said tabs are fixing means that are simple to form, and their ends can, for example, hook onto the band of the collar. As indicated above, said tabs are advantageously deformable, such deformation consisting, for example, in modifying the shape of their free ends under the effect of the tightening so that said free ends are released from the collar.

Advantageously, the clamping system of the invention further comprises pre-fitting means acting, when the band of the collar is in the non-tightened state, to secure said collar to one of the tubes.

This advantageous variant further facilitates fitting the clamping system onto the tubes. More precisely, in order to connect the tubes together by means of the clamping system, it is necessary merely to put said clamping system in place on one of the tubes by using the pre-fitting means, and then to bring the other tube closer, and to tighten the band of the collar.

Advantageously, the pre-fitting means are secured to or integral with the washer.

The collar constitutes a clamping part which must be capable of exerting large stresses on the tubes. In particular, it is made of metal, e.g. of ferritic or austenitic stainless steel, advantageously stabilized with titanium so as to withstand high temperatures. The washer generally constitutes a part that is deformable to some extent, and that is of thickness significantly smaller than the thickness of the collar. After tightening, it is not a function of the washer to exert a large stress on the ends of the tubes. For example, it is made of a metal such as ferritic or austenitic stainless steel. For example, the band of the collar and the washer have respective thicknesses of 1.5 millimeters (mm) and 0.4 mm.

The washer constitutes a part that is less costly than the collar in itself, in particular in terms of the quantity of raw material necessary for manufacturing. It is thus cheaper to make provision for the pre-fitting means to be secured to the washer and optionally even formed integrally with it, rather than forming pre-fitting means by making them directly secured to or integral with the collar.

In addition, pre-fitting means secured to or integral with the washer offer two fitting possibilities.

The first consists in securing the washer to the collar in order to handle the clamping system as a whole, in connecting the clamping system to the end of one of the tubes by using pre-fitting means, and then in bringing the other tube closer and in tightening the collar.

The second possibility consists in putting the washer in place on the end of one of the tubes by using the pre-fitting means, then in connecting the collar to the washer by securing said washer to said collar, and finally in bringing the other tube closer and in tightening the collar.

With either one of these possibilities, advantageous use is made of the fact that the washer is both secured to the collar and also provided with pre-fitting means.

Thus, the pre-fitting means may advantageously comprise pre-fitting tabs suitable for clinging onto a first one of the two tubes.

The pre-fitting tabs, which are advantageously formed integrally with the washer, constitute elements that are simple to form. As explained below, they advantageously co-operate with the outside periphery of the first tube.

In an alternative or complementary configuration, the pre-fitting means comprise gripping surfaces formed on an axial portion of the washer and suitable for gripping onto the inside periphery of a first one of the two tubes.

The gripping surfaces make it possible for the axial portion of the washer to be inserted by force into one of the tubes, thereby retaining the washer relative to said tube, so as to prevent the washer from being torn out.

It is advantages for the washer to have at least one portion of substantially frustoconical shape.

The frustoconical shape advantageously matches the shape of the ends of the tubes.

Advantageously, the washer has a sealing function. For example, this function can be performed, as in U.S. Pat. No. 3,964,773 by a washer of constant cross-section and of geometrical shape adapted to match the geometrical shapes of the ends of the tubes, in particular the above-mentioned frustoconical geometrical shape. However, advantageously a surface of the washer has at least one annular bead which forms a sealing ring.

The annular bead can behave like a sealing gasket by being capable of becoming flattened to some extent axially when the tubes are clamped together, in order to compensate for any geometrical shape defects in the ends of the tubes due to usual manufacturing tolerances.

The washer can thus be formed in one piece by comprising the means for securing it to the collar, optionally means for pre-fitting it to one of the tubes, and a portion forming a sealing gasket.

Depending on its shape, the washer can also merely serve to enable the collar to be pre-positioned relative to the tubes prior to fitting. When the washer has pre-fitting means, it can be fixed in a determined position relative to one of the tubes, so that, insofar as the washer is secured to the collar, the clamping system as a whole is positioned correctly relative to the tubes.

The invention will be well understood and its advantages will appear more clearly on reading the following detailed description of an embodiment shown by way of example, particularly, when such description is taken in conjunction with the attached drawing Figures and with the appended claims.

BRIEF DESCRIPTION OF THE DRAWING

FIG. 2 is a side view of FIG. 1, in which view the ends of the tubes to be connected by the clamping system are also sketched in;

FIG. 3 is an elevation view of the washer belonging to the clamping system of the invention;

FIG. 4 is a side view of FIG. 3;

FIG. 5 is a perspective view of the washer, seen looking from the direction V shown in FIG. 4;

FIGS. 6 and 7 are fragmentary axial section views of the clamping system as mounted on the end of one of the tubes, taken on respective ones of the radii VI and VII of FIG. 3;

BRIEF DESCRIPTION OF THE VARIOUS EMBODIMENTS OF THE INVENTION

Figure 1:
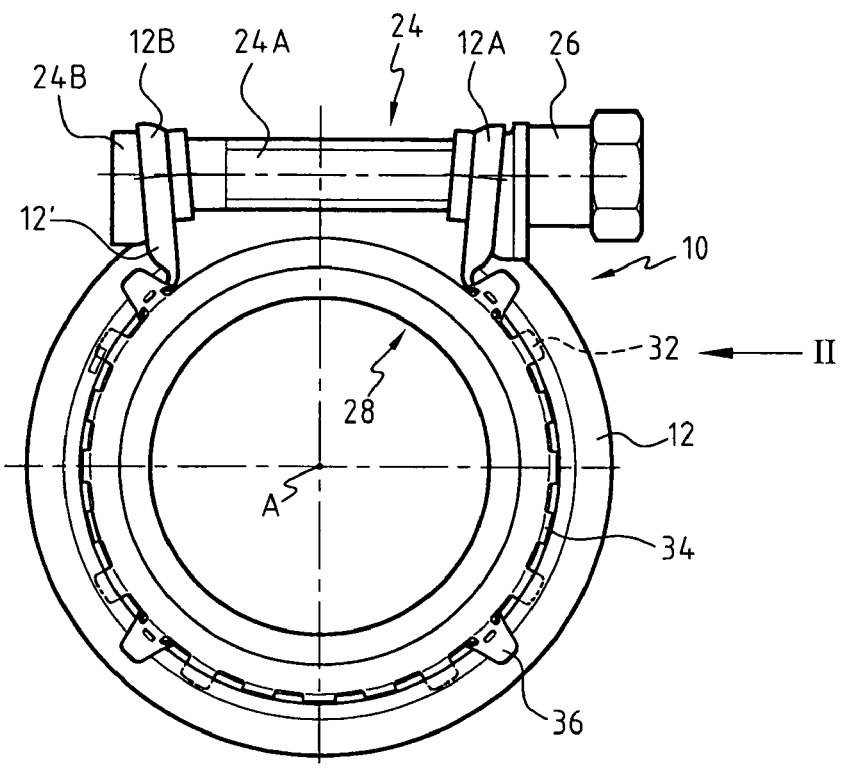
FIG. 1 is an elevation view of a clamping system of the invention.

The clamping system comprises a collar 10 that is substantially of the same type as described in Patent Application EP 0 305 232. The collar has a band 12 which, as can be seen more clearly in FIGS. 2 and 6 to 8, has an inside periphery which defines a setback 14 into which bearing surfaces, respectively 16 and 18 belonging to the ends of two tubes, respectively 20 and 22, can be inserted. The setback, and the bearing surfaces have shapes such that tightening the band of the collar constrains the ends of the tubes to move closer together. Thus, the band is advantageously V-shaped in cross-section, while the diameter of each of the bearing surfaces increases gradually going towards the free ends of the tubes, and said bearing surfaces are, for example, frustoconical in shape.

The band 12 has ends, respectively 12A and 12B, which are turned out substantially radially to form bearing tabs. The bearing tabs are provided with holes so as to enable the shank 24A of a bolt 24 to pass through said tabs. The head 24B of the bolt can be wedged relative to one of the bearing tabs (tab 12B in this example) while the free end of the bolt shank co-operates with a nut 26. The nut being turned in the tightening direction urges the bearing tabs 12A and 12B towards each other, and thus reduces the inside diameter of the collar, i.e. makes it possible to tighten the band. The bearing tabs are advantageously reinforced by suitable deformations, such as folded-back lips 12'.

Figure 8:
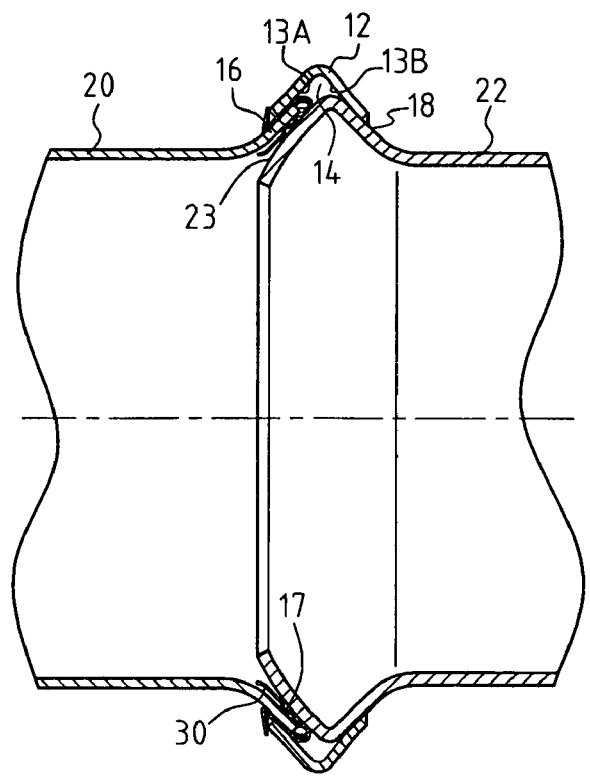
FIG. 8 is an axial section view of the clamping system as tightened on the ends of two tubes connected together.

The clamping system further comprises a washer 28 which is secured to the collar 10. The washer 28 has a portion 30 that is frustoconical in shape and that, as can be seen in FIG. 8, can be inserted between the facing ends of the two tubes 20 and 22 when they are clamped by means of the clamping system.

It should be noted that the end of the tube 20 is a female end, its inside periphery being flared. The end of the tube 22 is a male end which, beyond the bearing surface 18, has an outside periphery 23 whose diameter decreases going towards the free end. The free end 23 can thus be inserted, substantially with shape complementarity, inside the flare 17 formed at the free end of the tube 20. As can be seen in FIG. 8, the frustoconical portion 30 of the washer 28 is then disposed between the flare 17 and the end 23.

When the clamping system is mounted on the tubes, the branch 13A of the V-shaped cross-section of the collar co-operates with the bearing surface 16 of the tube 20. The washer 28 is disposed inside said branch 13A.

Figure 2:
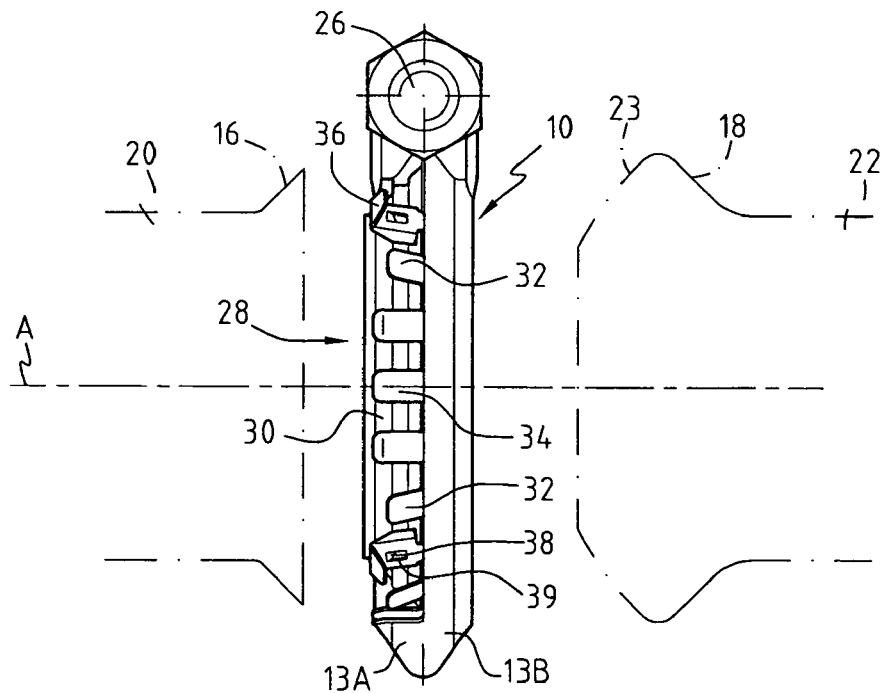

For reasons of clarity, the portion of the collar that corresponds to said branch 13A is almost totally cut away in the view shown in FIG. 2. When the collar is in the non-tightened state, with the washer secured to said collar, said washer extends inside the collar substantially to the junction between the branches 13A and 13B of the cross-section of the collar, i.e. to the vertex of the V formed by said branches.

The means for fixing the washer relative to the collar comprise fixing tabs which are connected to the washer and whose free ends are suitable for co-operating with the band of the collar. Indeed, said tabs are formed integrally with the washer.

In the advantageous example shown, the fixing tabs comprise tabs of various types. They thus comprise internal tabs 32 which, when the band of the collar is in the non-tightened state, co-operate with the inside periphery of said band, and external tabs which, when the band of the collar is in the non-tightened state, co-operate with an edge of the band or with the outside periphery thereof.

The internal tabs 32 are shorter than the external tabs and, as can be seen in particular in FIGS. 5 and 6, they are raised radially slightly so that their free ends bear against the inside of the branch 13A of the cross-section of the collar. In general, the internal tabs extend away from the axis A of the collar to a greater extent than the external tabs (e.g. they form an angle of about 10° relative to the axis A of the collar).

In the advantageous example shown, the external tabs are of two different types. As can be seen in FIG. 6, certain external tabs 34 differ from the internal tabs 32 in that they are longer than said internal tabs, and in that they extend substantially parallel to the axis A, so that they co-operate with one edge 13'A of the band of the collar. Naturally, in the example shown, said edge is the edge of the branch 13A. The outside faces of the tabs 34 merely rest against said edge. The free ends 34A can however be raised slightly. Insofar as the external tabs 34 are distributed over the circumference of the washer, said washer is centered relative to the band of the collar. The tabs 32 prevent the washer from being torn away from the collar in the direction F going away from the branch 13B of said band.

The external tabs further comprise tabs 36 that co-operate with the outside periphery of the collar. In this example, it is with the outside periphery of the branch 13A that the tabs 36 co-operate. The tabs 36 have free ends 36A that are hook-shaped and that hook onto the edge 13'A of the band of the collar by co-operating with the outside periphery of the portion 13A. The middle portions of the tabs 36 extend substantially parallel to the axis A, like the tabs 34, but their ends 36A are folded back. Thus, the tabs 36 prevent the washer from moving axially relative to the collar in the direction G going towards the branch 13B of the band of said collar.

As can be seen by comparing FIG. 7, which shows the situation before the collar is tightened, with FIG. 8, which shows the situation after tightening, the hook-shaped ends 36A of the tabs 36 tend to "unwrap" or "unfold" during the tightening, in order to enable the washer 28 to move towards the inside face of the branch 13A of the cross-section of the collar. At the same time, the tabs 32 and 34, and the middle portions of the tabs 36 tend to deform so that their outer ends move towards the axis A, i.e. they are finally disposed substantially parallel to the bearing surface 16.

Thus, the deformation of the tabs is accurately controlled and it enables satisfactory clamping contact to be established between the washer, the collar, and the tubes.

As can be seen in FIGS. 1 and 3, only a portion of the washer 28 that, when the band of the collar is in the non-tightened state, is disposed between the above-mentioned bearing tabs 12A and 12B is free of hooking tabs. The hooking tabs are distributed over the remainder of the periphery of the washer. They are distributed at regular angular intervals so as to avoid any possibilities of the washer moving relative to the collar. For example, the washer is provided with at least 3 or 4 tabs 32, at least 3 or 4 tabs 34, and at least 3 or 4 tabs 36, which are distributed over its periphery. In this example, it has been chosen to dispose 4 tabs 36, 6 tabs 32, each of which is adjacent to a tab 36, and a plurality of tabs 34 disposed between the tabs 32. For example, 9 tabs 34 are provided in all.

A description follows of the pre-fitting means that, when the band of the collar is in the non-tightened state, make it possible to secure the collar to one of the tubes. In this example, the collar is secured to the tube 20 (or more particularly to the free end thereof).

In the variant shown in FIGS. 1 to 8, the pre-fitting means comprise pre-fitting tabs which are suitable for clinging onto the tube 20. In this example, it has been chosen to make provision for the pre-fitting tabs to be the same as the above-described tabs 36. However, they could be other tabs that do not hook onto the collar in the manner of the tabs 36.

In particular, the means that make the pre-fitting possible, which are described below, are quite suitable for equipping the tabs 34.

In order to perform its pre-fitting function, a pre-fitting tab has a tongue 38 which is cut out from the tab and which has a free end suitable for co-operating with the outside periphery of the tube onto which it clings. For this purpose, a window 39 is cut out in the pre-fitting tab over three sides only, while the tongue 38 is formed by the cut-out portion that remains connected to the fourth side of the window, and that is folded back slightly relative to the tab that carries it.

The tongue 38 is disposed such that its free end is turned towards the axis A in the direction going towards the branch 13B of the collar. It is thus substantially perpendicular to the bearing surface 16 of the tube 20, onto which bearing surface it hooks. The tube is disposed such that its flared inside periphery 17 fits over the outside periphery of the portion 30 of the washer 28. The flared periphery 17 comes into contact with said outside periphery and can thus no longer advance in the direction G shown in FIG. 7 relative to the washer.

When the end of the tube 20 is inserted into the collar, the tongue 38 is elastically deformed slightly by moving towards the axis, and it then hooks onto the surface 16, thereby preventing the tube from moving relative to the collar in the direction F.

Thus, the washer, the clamping collar, and the tube 20 are wedged relative to one another in the axial directions F and G. Insofar as the tabs 36 whose ends 36A form hooks have been disposed appropriately in the vicinity of the bearing tabs 12A and 12B of the collar, the washer is also wedged angularly relative to said collar prior to tightening.

In this example, each of the tabs 36 is provided with a tongue 38. As indicated above, the tongues could, in alternative or complementary manner, be disposed on the tabs 34.

Considered together, the free ends of the tongues 38 define a circle of radius smaller than the maximum radius of the bearing surface 16, said maximum radius being, in this example, the radius of the free end of said bearing surface 16.

The free ends of the above-mentioned tabs 32 define a circle of radius larger than the minimum radius, prior to tightening, of the band of the collar, said minimum radius being, in this example, defined by the radius of the edge 13'A. When the washer 28 is put in place in the collar, the tabs 32 also deform elastically by moving towards the axis, and then they move back to co-operate with the inside periphery of the branch 13A of the cross-section of the collar. The tabs 34 and the middle portions of the tabs 36 define a circle of radius substantially equal to the radius of the circle defined by the edge 13'A.

Advantageously, the pre-fitting means make it possible not only to wedge the clamping system axially relative to the first tube, but also to wedge it angularly. For this purpose, at least one pre-fitting tab has at least one sloping edge suitable for co-operating with the outside periphery of the first tube.

In this example, and as can be seen more clearly in FIGS. 3 and 5, the axial edges 36B of the tabs 36 are folded over towards the axis A. For example, the two axial edges of each tab 36 are folded over in this way and they define between them an angular sector of about 60°. The sloping edges 36B also cling onto the bearing surface 16 of the tube 20. Because of their inclinations, they work against the washer 28 turning relative to the tube 20. In the same way as for the tongues 38, it is possible to choose to provide such folded-over axial edges on the tabs 34 rather than on the tabs 36.

As shown in the figures, in particular in FIGS. 6 and 7, a surface of the washer has an annular bead which forms a sealing ring. Actually, the washer is a part of substantially constant thickness, formed by successively deforming and by cutting a cylindrical or annular part. Expansion or shrinkage imparts its frustoconical shape to the washer, while the tabs are cut out. Considered in axial section, the washer 28 (its frustoconical portion 30) has a fold which defines said annular bead, designated by reference 40.

The bead 40 can act as a sealing gasket co-operating in leaktight manner with the tubes. Actually, it is advantageous for the washer to have a bead 40 over its inside periphery, serving to co-operate with the end 23 of the tube 22, and also a bead 42 situated on its outside periphery for co-operating with the flare 17 in the tube 20. The beads are shaped as folds, and, when considering the inside periphery of the portion 30 of the washer between its two axial ends, firstly a setback is observed (which, on the outside periphery of the washer, forms the bead 42), and then the bead 40 is observed. In reality, the beads 40 and 42 are formed at either end of a portion 31 of the washer that is parallel to the axis A, and that is defined by two shoulders. As can be seen in FIG. 8, during the tightening, the beads 40 and 42 can be flattened slightly in order to co-operate in leaktight manner with the tubes.

At its inner end (the end whose diameter is the smaller), the portion 30 of the of the washer has an axial extension 30A. In axial section, the washer thus forms an angle with the junction where the extension 30A meets the portion 30. As a result, the washer is stiffened.

The folds formed by shaping the beads 40 and 42 also contribute to stiffening the washer. The stiffening makes it possible to limit the tendency of the washer to buckle due to the stresses exerted on it during tightening, the distribution of the stress that the tabs 32, 34, and 36 transmit depending on how the tabs are disposed, and optionally being non-uniform around the washer.

Figure 9:
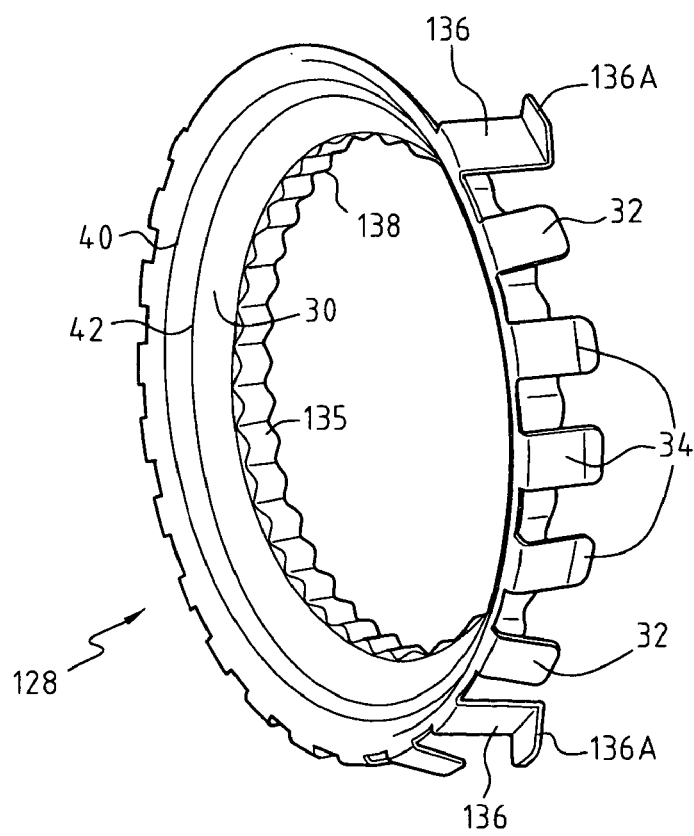
FIG. 9 is a perspective view of the washer of a clamping system in a variant of the invention.

A description follow of FIG. 9 which shows a variant of the pre-fitting means for pre-fitting the clamping system to the first tube. Like the variant in the preceding figures, the variant shown in FIG. 9 makes provision for the pre-fitting means to be formed on the washer. The washer 128 of FIG. 9 is substantially analogous to the above-described washer 28, in that, like that washer, it has a frustoconical portion 30, the above-described beads 40 and 42, and the fixing tabs, comprising tabs 32 suitable for co-operating with the inside periphery of the band, tabs 34 suitable for co-operating with the edge 13'A of the band of the collar, and tabs 136 suitable for hooking onto said band. The tabs 136 differ slightly from the above-mentioned tabs 36 in that they are free of pre-fitting tongues 38. They can optionally have the folded-over edges 36B of the tabs 36. In any event, the free ends 136A of the tabs 136 are folded back to form hooks like the free ends 36A of the tabs 36. In the example shown in FIG. 9, the pre-fitting means comprise gripping surfaces which are formed on an axial portion 135 of the washer 128 and which are suitable for gripping onto the inside periphery of the first tube. In order to perform the pre-fitting, the axial portion 135 is thus inserted by force into the first tube. Naturally, it is possible to make provision for the gripping surfaces of FIG. 9 to coexist with the pre-fitting means described with reference to FIGS. 1 to 8.

FIG. 9 shows that the axial portion 135 of the washer 128 has outwardly projecting deformations designated by the reference 138 that locally increase its radial dimensions and that thus form the above-mentioned gripping surface.

In this example, the outwardly projecting deformations are formed merely by uniform undulations extending from the free edge of the axial portion 135 or substantially over the entire length of said portion.

The invention claimed is:

1. A clamping system for connecting two tubes together in leaktight manner, the tubes having facing ends with bearing surfaces that project relative to cylindrical outside surfaces of said tubes, the system comprising:
   a collar having a band suitable for being tightened on said bearing surfaces, said band having an inside periphery defining a setback for said bearing surfaces; and
   a washer secured to the collar by hooking tabs suitable for being deformed when the band is tightened, said hooking tabs being secured to or integral with the washer and having free ends in a hooking engagement with the band of the collar, wherein the washer further including internal tabs having free ends which co-operate with the inside periphery of said band in a non-tightened state thereof.

2. A clamping system according to claim 1, wherein the washer has at least one portion of substantially frustoconical shape.

3. A clamping system according to claim 1, wherein the washer further comprising external tabs which cooperate with an edge of the band and are substantially parallel to an axis of the clamping system.

4. A clamping system for connecting two tubes together in leaktight manner, the tubes having facing ends with bearing surfaces that project relative to cylindrical outside surfaces of said tubes, the system comprising:
   a collar having a band suitable for being tightened on said bearing surfaces, said band having an inside periphery defining a setback for said bearing surfaces;
   a washer secured to the collar by hooking tabs suitable for being deformed when the band is tightened, said hooking tabs being secured to or integral with the washer and having free ends in a hooking engagement with the band of the collar; and
   pre-fitting means acting, when the band of the collar is in a non-tightened state, to secure said collar to one of the tubes.

5. A clamping system according to claim 4, wherein the prefitting means are secured to or integral with the washer.

6. A clamping system for connecting two tubes together in leaktight manner, the tubes having facing ends with bearing surfaces that project relative to cylindrical outside surfaces of said tubes, the system comprising:
   a collar having a band suitable for being tightened on said bearing surfaces, said band having an inside periphery defining a setback for said bearing surfaces; and
   a washer secured to the collar by hooking tabs suitable for being deformed when the band is tightened, said hooking tabs being secured to or integral with the washer and having free ends in a hooking engagement with the band of the collar, wherein the washer comprises pre-fitting tabs suitable for clinging onto a first one of the two tubes, and wherein at least one pre-fitting tab has a tongue cut out therein and having a free end suitable for co-operating with an outside periphery of the first tube.

7. A clamping system according to claim 6, wherein the at least one pre-fitting tab having at least one sloping edge suitable for co-operating with an outside periphery of the first tube.

8. A clamping system for connecting two tubes together in leaktight manner, the tubes having facing ends with bearing surfaces that project relative to cylindrical outside surfaces of said tubes, the system comprising:

a collar having a band suitable for being tightened on said bearing surfaces, said band having an inside periphery defining a setback for said bearing surfaces; and a washer secured to the collar by hooking tabs suitable for being deformed when the band is tightened, said hooking tabs being secured to or integral with the washer and having free ends in a hooking engagement with the band of the collar, wherein the washer comprises pre-fitting tabs suitable for clinging onto a first one of the two tubes, and wherein at least one of the prefitting tabs is also a hooking tab that has a free end folded back on an outside periphery of the band of the collar when the collar is in a non-tightened state, so that said free end is in a hooking engagement with the band of the collar.

9. A clamping system for connecting two tubes together in leaktight manner, the tubes having facing ends with bearing surfaces that project relative to cylindrical outside surfaces of said tubes, the system comprising:

a collar having a band suitable for being tightened on said bearing surfaces, said band having an inside periphery defining a setback for said bearing surfaces; and a washer secured to the collar by hooking tabs suitable for being deformed when the band is tightened, said hooking tabs being secured to or integral with the washer and having free ends in a hooking engagement with the band of the collar, wherein the washer comprises gripping surfaces formed on an axial portion of the washer located radially inwardly of the washer, and suitable for gripping onto an inside periphery of a first one of the two tubes.

10. A clamping system according to claim 9, wherein said axial portion of the washer has outwardly projecting deformations, locally increasing radial dimensions thereof and forming said gripping surfaces.

11. A clamping system for connecting two tubes together in leaktight manner, the tubes having facing ends with bearing surfaces that project relative to cylindrical outside surfaces of said tubes, the system comprising:

a collar having a band suitable for being tightened on said bearing surfaces, said band having an inside periphery defining a setback for said bearing surfaces; and a washer secured to the collar by hooking tabs suitable for being deformed when the band is tightened, said hooking tabs being secured to or integral with the washer and having free ends in a hooking engagement with the band of the collar, wherein a surface of the washer has at least one annular bead forming a sealing ring.

12. A clamping system for connecting two tubes together in leaktight manner, the tubes having facing ends with bearing surfaces that project relative to cylindrical outside surfaces of said tubes, the system comprising:

a collar having a band suitable for being tightened on said bearing surfaces, said band having an inside periphery defining a setback for said bearing surfaces; and a washer secured to the collar by hooking tabs suitable for being deformed when the band is tightened, said hooking tabs being secured to or integral with the washer and having free ends in a hooking engagement with the band of the collar, wherein at least one of the hooking tabs has a free end folded back on an outside periphery of the band of the collar in a non-tightened state.

13. A clamping system for connecting two tubes together in leaktight manner, the tubes having facing ends with bearing surfaces that project relative to cylindrical outside surfaces of said tubes, the system comprising:

a collar having a band suitable for being tightened on said bearing surfaces, said band having an inside periphery defining a setback for said bearing surfaces; and a washer secured to the collar by hooking tabs suitable for being deformed when the band is tightened, said hooking tabs being secured to or integral with the washer and having free ends in a hooking engagement with the band of the collar, wherein the washer has an annular portion adapted to be located between the facing ends of the tubes when the clamping system cooperates with said tubes.

14. A clamping system for connecting two tubes together in leaktight manner, facing ends of the tubes having bearing surfaces that project relative to cylindrical outside surfaces of said tubes, the system comprising:

a collar having a band suitable for being tightened on said bearing surfaces, said band having an inside periphery defining a setback for said bearing surfaces; and a washer adapted to be hooked to the end of a first one of said tubes by pre-fitting tabs having clinging tongues cut out in said tubes and suitable for cooperating in a hooking engagement with an outside periphery of the first tube.

15. A clamping system according to claim 14, wherein at least one of the prefitting tabs has at least one sloping edge suitable for cooperating with an outside periphery of the first tube.

16. A clamping system according to claim 14, wherein at least one of the pre-fitting tabs has a free end folded back on an outside periphery of the band of the collar when the collar is in a non-tightened state, so as to hook on said outside periphery.

17. A clamping system according to claim 14, wherein a surface of the washer has at least one annular bead forming a sealing ring adapted to be located between the facing ends of the tubes when the clamping system cooperates with said tubes.

18. A method of connecting two tubes together in leaktight manner, facing ends of the tubes having sloped bearing surfaces that project relative to cylindrical outside surfaces of said tubes, said method comprising the steps of:

providing a collar having a band suitable for being tightened on said bearing surfaces, said band having an inside periphery defining a setback for said bearing surfaces;

providing a washer independently from said collar, said washer having a first hooking means for hooking engagement with an end of a first one of said two tubes and having a second hooking means for hooking engagement with said collar;

securing said washer, by way of said first hooking means, to said end of said first one of said two tubes;

securing said collar, by way of said second hooking means, to said washer; and tightening said band of said collar for connecting said two tubes together in said leaktight manner.

* * * * *